United States Patent
Javaid et al.

(10) Patent No.: US 12,210,272 B2
(45) Date of Patent: Jan. 28, 2025

(54) HOT PLUGGABLE ELECTRICAL DEVICE ASSEMBLY

(71) Applicant: Eaton Intelligent Power Limited, Dublin (IE)

(72) Inventors: Yasar Ali Javaid, Luton (GB); Vidar Folgero, Arendal (NO); Stewart John Parfitt, Wilstead (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 113 days.

(21) Appl. No.: 18/047,194

(22) Filed: Oct. 17, 2022

(65) Prior Publication Data
US 2023/0119431 A1 Apr. 20, 2023

Related U.S. Application Data

(60) Provisional application No. 63/262,721, filed on Oct. 19, 2021.

(51) Int. Cl.
*G03B 17/56* (2021.01)
*H04N 23/90* (2023.01)

(52) U.S. Cl.
CPC ......... *G03B 17/561* (2013.01); *G03B 17/566* (2013.01); *H04N 23/90* (2023.01)

(58) Field of Classification Search
CPC .................................................. H04N 23/555
See application file for complete search history.

(56) References Cited

U.S. PATENT DOCUMENTS

| | | | | |
|---|---|---|---|---|
| 5,217,395 A * | 6/1993 | Bailey | ................... | H01R 29/00 439/627 |
| 6,678,001 B1 * | 1/2004 | Elberbaum | ...... | G08B 13/19619 348/373 |
| 6,893,284 B1 * | 5/2005 | Fawcett | ............. | H01R 13/6276 439/258 |
| 8,605,158 B2 | 12/2013 | Yoshizumi | | |
| 2006/0216019 A1 * | 9/2006 | Thompson | ............. | F16M 11/18 348/E5.026 |
| 2007/0126872 A1 * | 6/2007 | Bolotine | ................ | H04N 23/50 348/E7.086 |
| 2017/0106763 A1 * | 4/2017 | Dow | ....................... | B60L 53/37 |

OTHER PUBLICATIONS

International Search Report and Written Opinion for PCT Application No. PCT/EP2022/025478, Feb. 22, 2023, 8 pages, Rijswijk, Netherlands.

* cited by examiner

*Primary Examiner* — Noam Reisner
(74) *Attorney, Agent, or Firm* — Stinson LLP

(57) ABSTRACT

A camera includes a base configured for mounting to a support structure. The base includes a first connecting structure. A camera unit is configured for releaseable attachment with the base. The camera unit comprising second connecting structure configured for releasable connection with the first connecting structure to releaseably secure the camera unit to the base.

12 Claims, 13 Drawing Sheets

HOT PLUGGABLE ELECTRICAL DEVICE ASSEMBLY

CROSS-REFERENCE TO RELATED APPLICATION

This application claims priority to U.S. Provisional Patent Application Ser. No. 63/262,721, filed Oct. 19, 2021, and which is hereby incorporated by reference in its entirety.

FIELD

The present disclosure generally relates to an electrical device assembly such as a pan/tilt/zoom (PTZ) camera, and more particularly to PTZ camera for use in harsh or hazardous environments.

BACKGROUND

Conventional PTZ cameras may be used in hazardous environments such as the marine and oil and gas industry, and can be designed to perform safely and reliably under these often extreme corrosive and physically demanding environments. Typically, these PTZ cameras are large and heavy and require cranes and qualified engineers for installation on site. For example, PTZ cameras of this type are often housed in large steel housings/enclosures. A qualified team will also be needed if the cameras require servicing or replacing. These PTZ cameras are also configured as single unitary housing assemblies such that when it becomes necessary to service or replace the camera, the entire camera must be removed from the work site. This process can be expensive and time consuming.

SUMMARY

In one aspect, a camera generally comprises a base configured for mounting to a support structure. The base includes a first connecting structure. A camera unit is configured for releaseable attachment with the base. The camera unit comprising second connecting structure configured for releasable connection with the first connecting structure to releaseably secure the camera unit to the base.

In another aspect, an electrical device generally comprises an electrical device body housing electronics for operating the electrical device. A connector is coupled to the electrical device body. The connector includes a hot pluggable electrical connector configured for making an electrical connection with a base to electrically connect the electrical device to the base when the base is energized.

In yet another aspect, a method of installing a camera in a hazardous environment generally comprises mounting a base of the camera to a mounting structure. Attaching a camera unit of the camera to the base after the base has been mounted to the mounting structure. The camera unit includes camera electronics for operating the camera unit.

In still another aspect, a base for use with an electrical device generally comprises a mount assembly configured for attaching the base to a support surface. The mount assembly provides structure on the base for attaching the electrical device to the base. A hot pluggable electrical connector is coupled to the mount assembly and configured for making an electrical connection with the electrical device to electrically connect the base to the electrical device when the base is energized.

BRIEF DESCRIPTION OF THE DRAWINGS

Corresponding reference characters indicate corresponding parts throughout the drawings.

DETAILED DESCRIPTION

Figure 1:
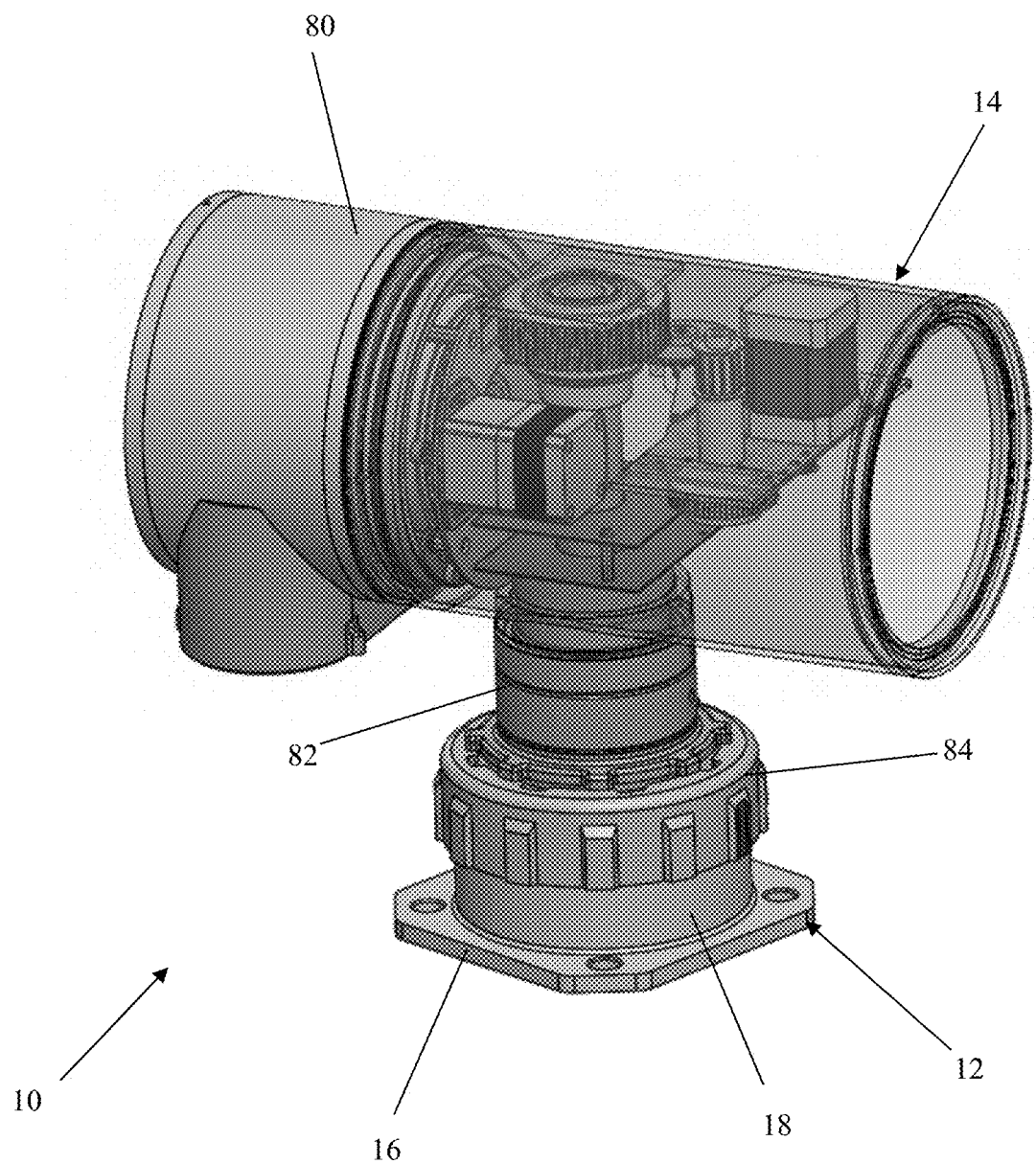
FIG. 1 is a perspective of a PTZ camera of the present disclosure with portions shown as transparent showing internal detail.
Figure 2:
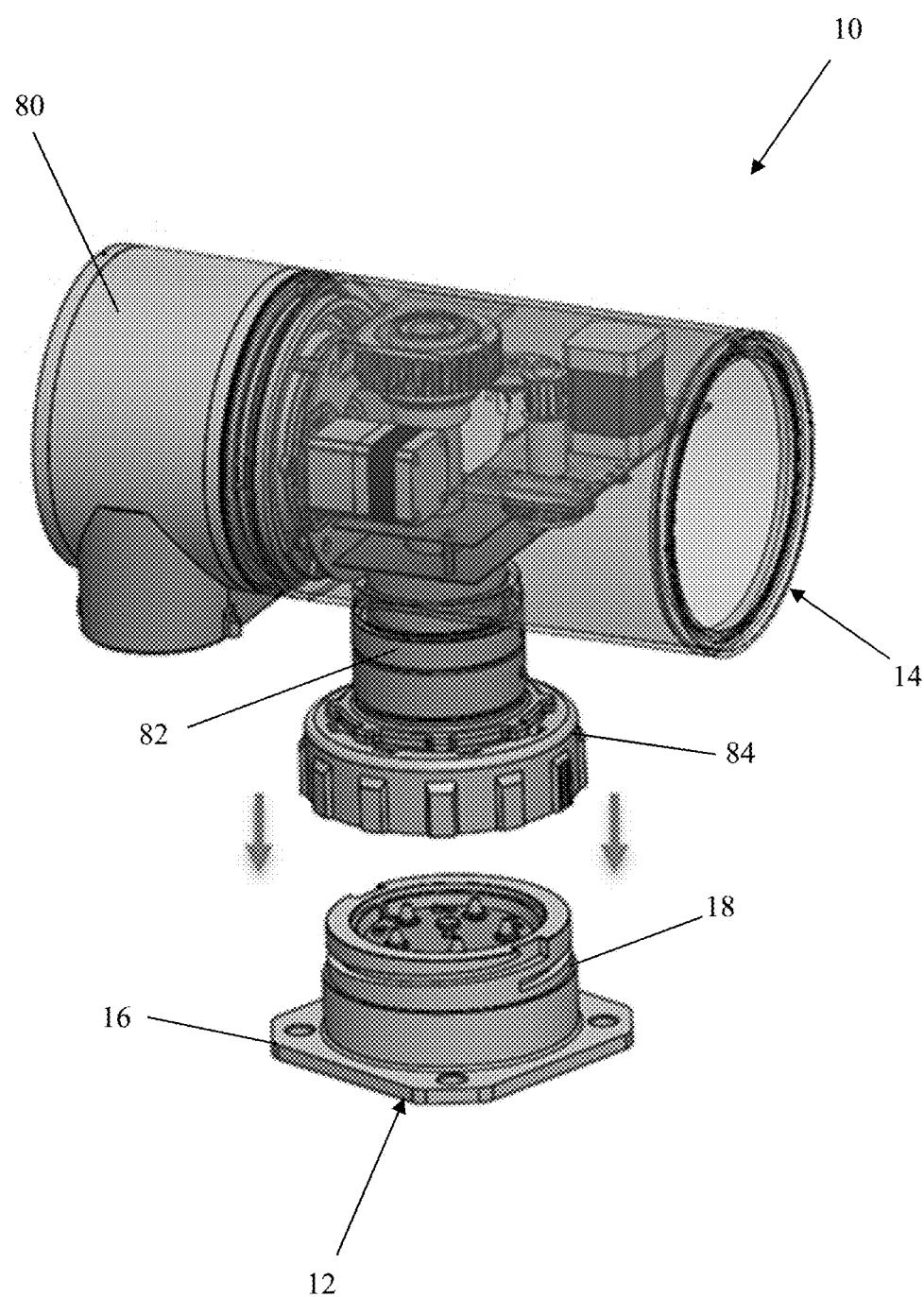
FIG. 2 is an exploded view of the PTZ camera in FIG. 1 showing a camera unit and base of the camera.

Referring to FIGS. 1 and 2, a pan/tilt/zoom (PTZ) camera (broadly, an electrical device assembly) of the present disclosure is generally indicated at 10. The camera may comprise a base 12 configured to mount to a mounting structure (e.g., wall or other fixed structure) to secure the PTZ camera to the mounting structure, and a camera unit 14 (broadly, an electrical device) removeably attachable to the base to connect the camera unit to the base and configure the PTZ camera for use. In one embodiment, the camera unit 14 is removeably attachable to the base 12 without the use of any tools or separate connectors such that the camera unit can be easily attached and detached from the base. In another embodiment, a tool 15 (FIG. 8B) may be used to secure the camera unit 14 to the base 12. This facilitates removal and replacement of the camera unit 14 from the base 12 without having to detach or disconnect the base from the mounting structure and/or a power/communication source. Therefore, changing/replacing the camera unit 14 can be accomplished without the need for a qualified engineer or technician. As a result, different camera units 14 can be used based on the desired functionality and easily interchanged by an individual at the work site. In the illustrated embodiment, the camera 10 is PTZ camera. However, the camera 10 could have other configurations without departing from the scope of the disclosure. For example, the camera 10 could be a fixed camera, a camera lacking one or more of the pan, tilt, and zoom features, and/or a camera having other features not described in the current disclosure. Additionally, the base 12 can be used with electrical devices other than a camera.

Figure 3:
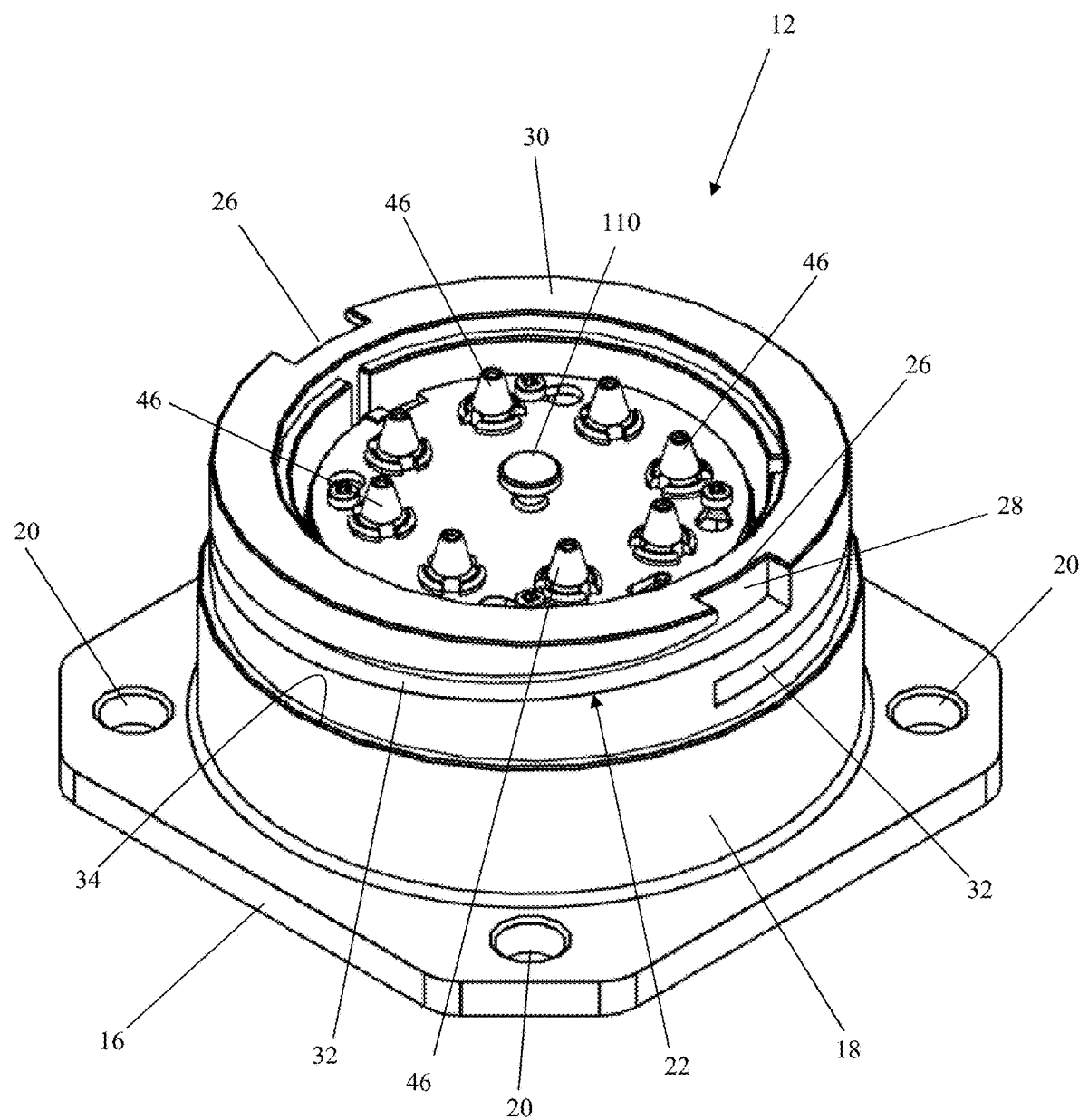
FIG. 3 is a perspective of the base.
Figure 4:
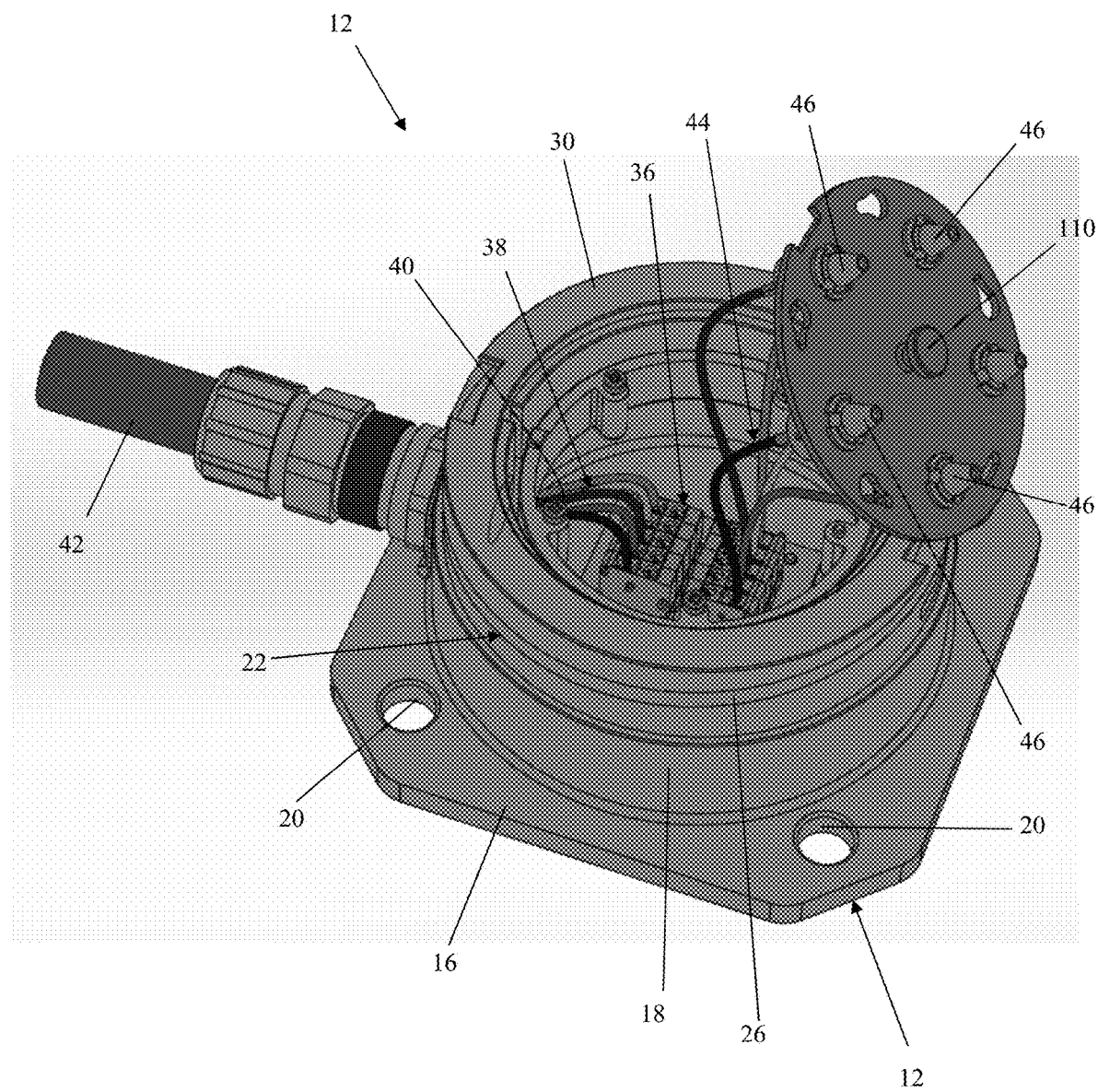
FIG. 4 is a partially separated perspective of the base showing a cable attached to the base.

Referring to FIGS. 3 and 4, the base 12 comprises a mounting plate 16 and a camera mount (broadly, a mount) 18 projecting laterally from the mounting plate. The mounting plate 16 and camera mount 18 may be broadly considered a mounting assembly. The camera mount 18 is shown as being formed integrally with the mounting plate 16. However, the camera mount 18 could be formed separately from the mounting plate 16 and suitably attached to the mounting plate. In the illustrated embodiment, the mounting plate 16 has a generally rectangular shape and defines fastener holes 20 for receiving fasteners (not shown) to attach the mounting plate to the mounting structure. It will be understood that the mounting plate 16 could have other shapes and configurations without departing from the scope of the disclosure. The camera mount 18 provides the structure on the base 12 for attaching the camera unit 14 to the base. The camera mount 18 comprises a generally cylindrical structure. However, the camera mount 18 could have other shapes and configurations without departing from the scope of the disclosure. An exterior surface of the camera mount 18 has connecting structure 22 configured to engage with corresponding connecting structure 24 (FIG. 7) on the camera unit 14 to releaseably lock the camera unit to the base 12. In the illustrated embodiment, the connecting structure 22 comprises a plurality of slots 26 extending along the outer surface of the camera mount 18. Each slot 26 comprises a first, axially extending section 28 extending from a rim 30 of the camera mount 18 toward the mounting plate 16. A second, circumferentially extending section 32 extends from an end of the first section 28 partially around a circumference of the camera mount 18. The second section 32 extends slightly toward the mounting plate 16 as the second section extends around the camera mount 18. In the illustrated embodiment, there are two slots 26 in the outer surface of the camera mount 18. The first sections 28 of the slots 26 are disposed on diametrically opposite sides of the camera mount 18. It will be understood that one or more than two slots could be used without departing from the scope of the disclosure. A ledge 34 extends circumferentially around the outer surface of the camera mount 18. In the illustrated embodiment, the ledge 34 extends continuously around an entire circumference of the camera mount 18. As indicated above, and explained in greater detail below, the connecting structure 22, including the slots 26, is engageable with the connecting structure 24 on the camera unit 14 to releaseably lock the camera unit to the base 12. It will be understood that the connecting structure 22 on the base 12 could have over configurations without departing from the scope of the disclosure. For instance, threads could extend around the outer surface of the camera mount 18 for mating with threads on the camera unit 14. Still other connecting structure configurations are envisioned.

The base 12 may be formed from any suitable material. In one embodiment, at least the camera mount 18 is formed from a polymer material. In another embodiment, an entirety of the base 12 is made from a polymer material. Forming some or all of the base 12 from a polymer material substantially reduces the weight of the base as compared to conventional PTZ cameras that are made from stainless steel. In one embodiment, the base 12 weights less than 2 kg. Additionally, the lighter base 12 facilitates easy installation of the base to a mounting structure as a single person can install the base. Further, the person need not have any specific camera installation expertise as the camera unit 14 is not part of the initial installation of the camera 10. That is, the wiring of the camera unit 14 is not connected to the base when the base 12 is mounted to the mounting structure. It will be understood, however, that some or all of the base 12 could be made from another material. For instance, the base 12 could be formed from stainless steel.

Figure 5:
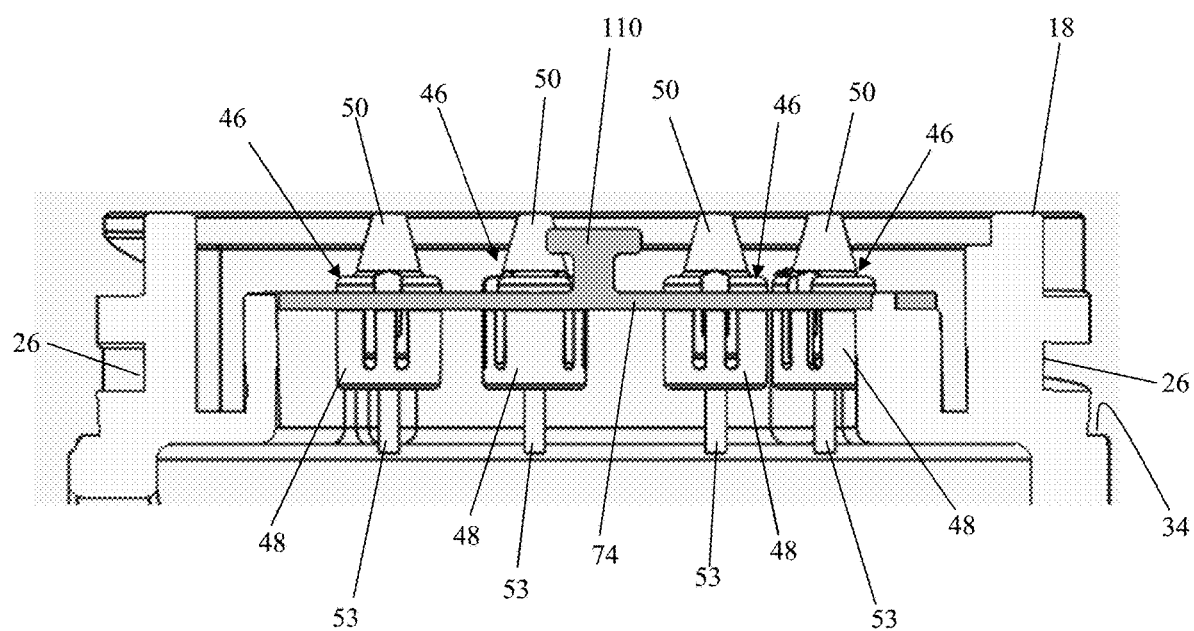
FIG. 5 is a fragmentary cross section of the base.
Figure 6:
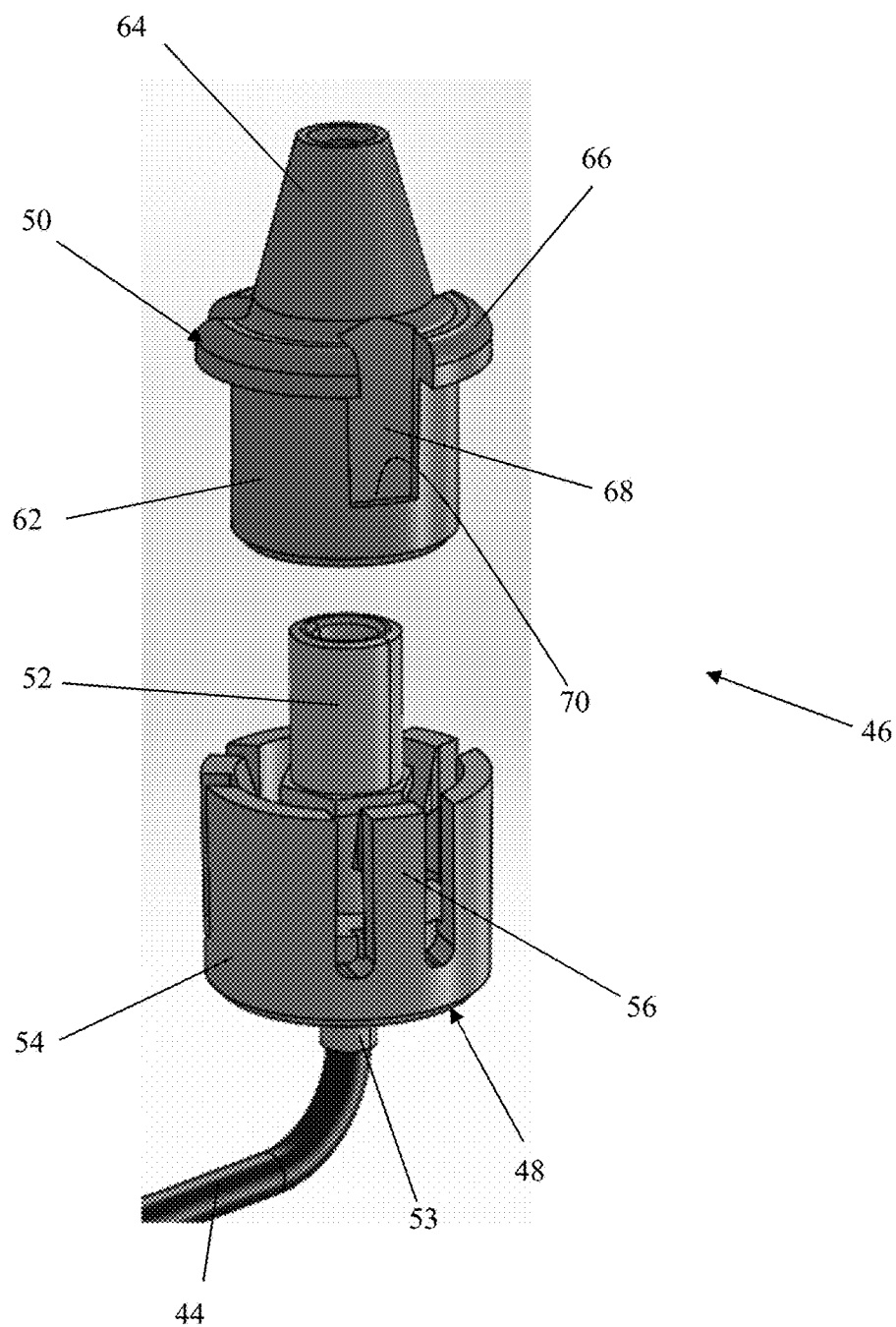
FIG. 6 is an exploded view of a connector assembly in the base.

Referring to FIGS. 4-6, the camera mount 18 also houses internal electrical components 36 of the base 12 for electrically connecting the base to the camera unit 14. Wiring extends from the electrical components 36 for caring the electrical signals to and from the electrical components. A first set of wiring 38 extends from the electrical components 36 through a port 40 in the camera mount 18 to an exterior of the camera mount. A cable 42 encloses the first set of wiring 38 at an exterior of the base 12. The cable 42 is extendable to a power source (not shown) for providing power to the camera 10. A second set of wiring 44 extends from the electrical components 36 to a plurality of connector assemblies 46 (broadly, electrical connectors). Each connector assembly 46 is configured to make an electrical connection with a connector assembly 47 (broadly, electrical connector) in the camera unit 14. In the illustrated embodiment, the connector assemblies 46, 47 comprise hot pluggable connectors such that the camera unit 14 can be connected to the base 12 and electrically connected to the electrical components 36 in the base without having to disconnect the base from the power source. This is particularly advantageous when the camera 10 is used in hazardous environments because the camera unit 14 can be connected and disconnected without having to have a gas clearance indicating that the environment is not explosive. Thus, the connection and disconnection of the camera unit 14 can be performed within a hazardous/explosive environment. Broadly, the base 12, or least the camera mount 18 of the base, may be considered a junction box of the camera 10 such that it includes the electrical components 36 and wiring 38, 44 for delivering power and functionality to the camera unit 14. In one embodiment, a cap (not shown) may be disposed over the camera mount 18 when the camera unit 14 is not attached to the camera mount to configure the base as an exe structure or provide IP ingress protection.

Referring to FIGS. 5 and 6, each connector assembly 46 comprises a first, lower housing 48 and a second, upper housing 50 attached to the first housing. A tubular connector element 52 is at least partially received in the first housing 48. The tubular connector element 52 may be broadly considered an electrical contact. The first housing 48 comprises an annular member 54 extending around the tubular connector element 52. The tubular connector element 52 includes a wire connector portion 53 extending below the annular member 54. The annular member 54 includes a plurality of fingers 56 spaced circumferentially around the annular member. Each finger 56 includes an axially extending portion and a catch portion projecting radially inward from the axially extending portion. The catch portion is configured to latch on to the second housing 50 to secure the first housing 48 to the second housing as will be explained in greater detail below. The second housing 50 comprises a cylindrical bottom section 62, a conical top section 64, and an annular middle section 66 between the top and bottom sections. A recess or cutout 68 in the bottom and annular sections 62, 66 forms a shoulder 70 in the bottom section. In the illustrated embodiment, each connector assembly 46 is an Exde connector. However, the connector assemblies 46 could have other configurations without departing from the scope of the disclosure.

Prior to attaching the first housings 48 to the second housings 50, the tubular connector elements 52 are placed in registration within respective openings 72 in a connector plate 74. The second housings 50 are also placed in registration with one of the openings 72 in the connector plate 74. To attach the first housing 48 to the second housing 50, the cylindrical bottom section 62 of the second housing is inserted through one of the openings 72 in the connector plate 74. The tubular connector element 52 of the first housing 48 is then inserted into a bottom of the cylindrical bottom section 62 of the second housing 50. The catch portions on the fingers 56 snap over the shoulders 70 on the second housing 50 forming a plurality of latches for securing the first housing 48 to the second housing. With the first and second housing 48, 50 connected together, the annular middle section 66 of the second housing seats on a top surface of the connector plate 74.

Referring to FIGS. 1, 2, and 7-8B, the camera unit 14 comprises a camera body 80 housing the internal camera components of the camera unit, a stem 82 attached to the camera body at a first end of the stem and extending laterally from the camera body to a second end of the stem, and a connector 84 attached to the second end of the stem. The connector 84 comprises a sleeve 85 attached to the stem 82 and a collar 87 secured around the sleeve. In the illustrated embodiment, the sleeve 85 and collar 87 comprise generally annular members. However, the sleeve 85 and collar 87 could have other configurations without departing from the scope of the disclosure. The connector 84 is configured to connect to the camera mount 18 on the base 12 to releaseably connect the camera unit 14 to the base. In particular, an interior surface 86 of the collar 87 has the connecting structure 24 configured to engage with the connecting structure 22 (FIG. 3) on the camera mount 18 of the base 12 to releaseably lock the camera unit to the base. In the illustrated embodiment, the connecting structure 24 comprises a plurality of flanges 88 extending radially inward from the interior surface 86 of the collar 87. Each flange 88 is configured to be received in a slot 26 in the camera mount 18 to secure the connector 84 to the camera mount. Thus, the number of flanges 88 corresponds to the number of slots 26 in the camera mount 18. In one embodiment, the flanges 88 and slots 26 provide a bayonet style connection between the camera unit 14 and base 12.

Figure 7:
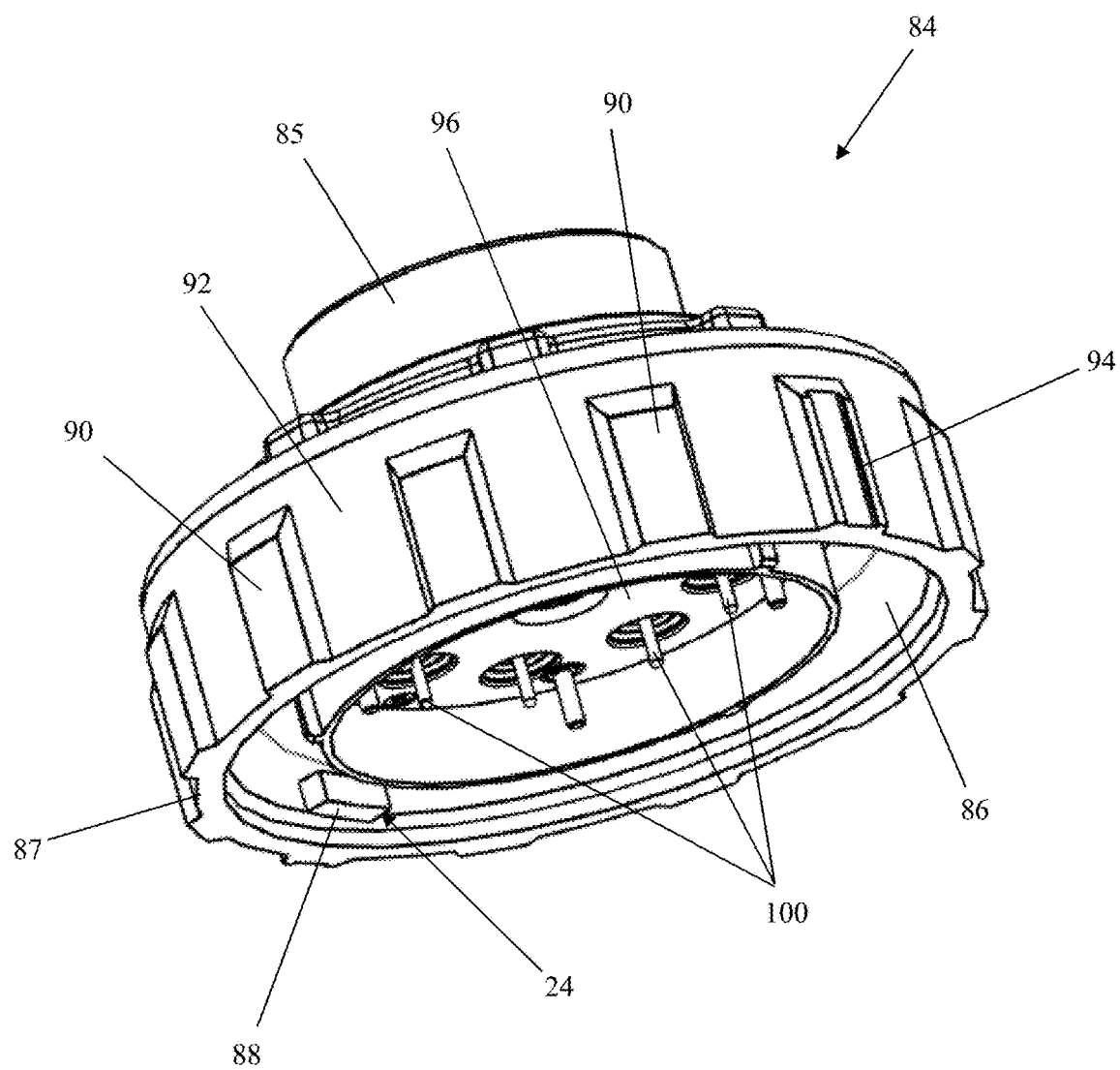
FIG. 7 is a perspective of a connector of the camera unit.
Figure 8A:
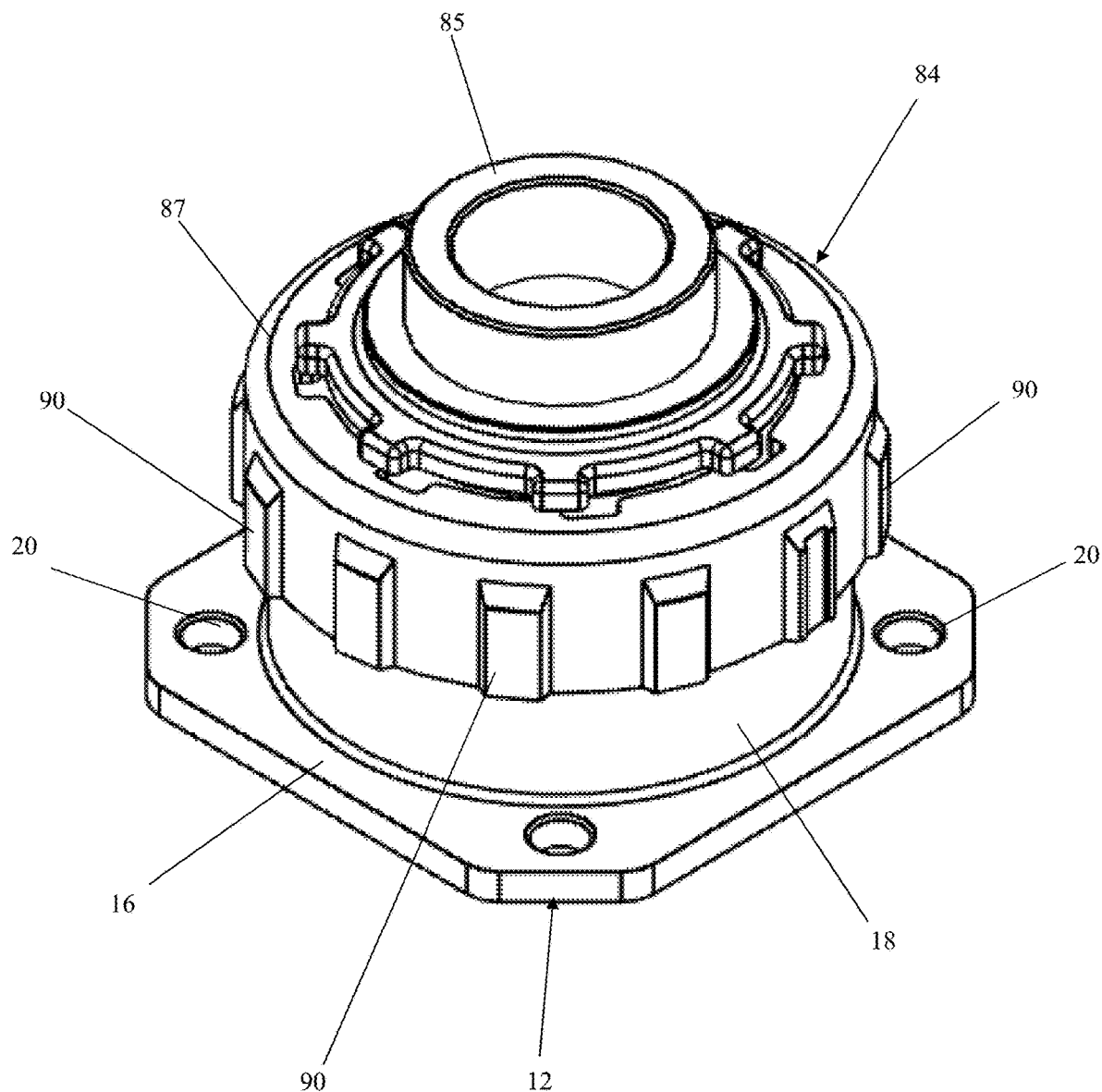
FIG. 8A perspective of the connector attached to the base.
Figure 8B:
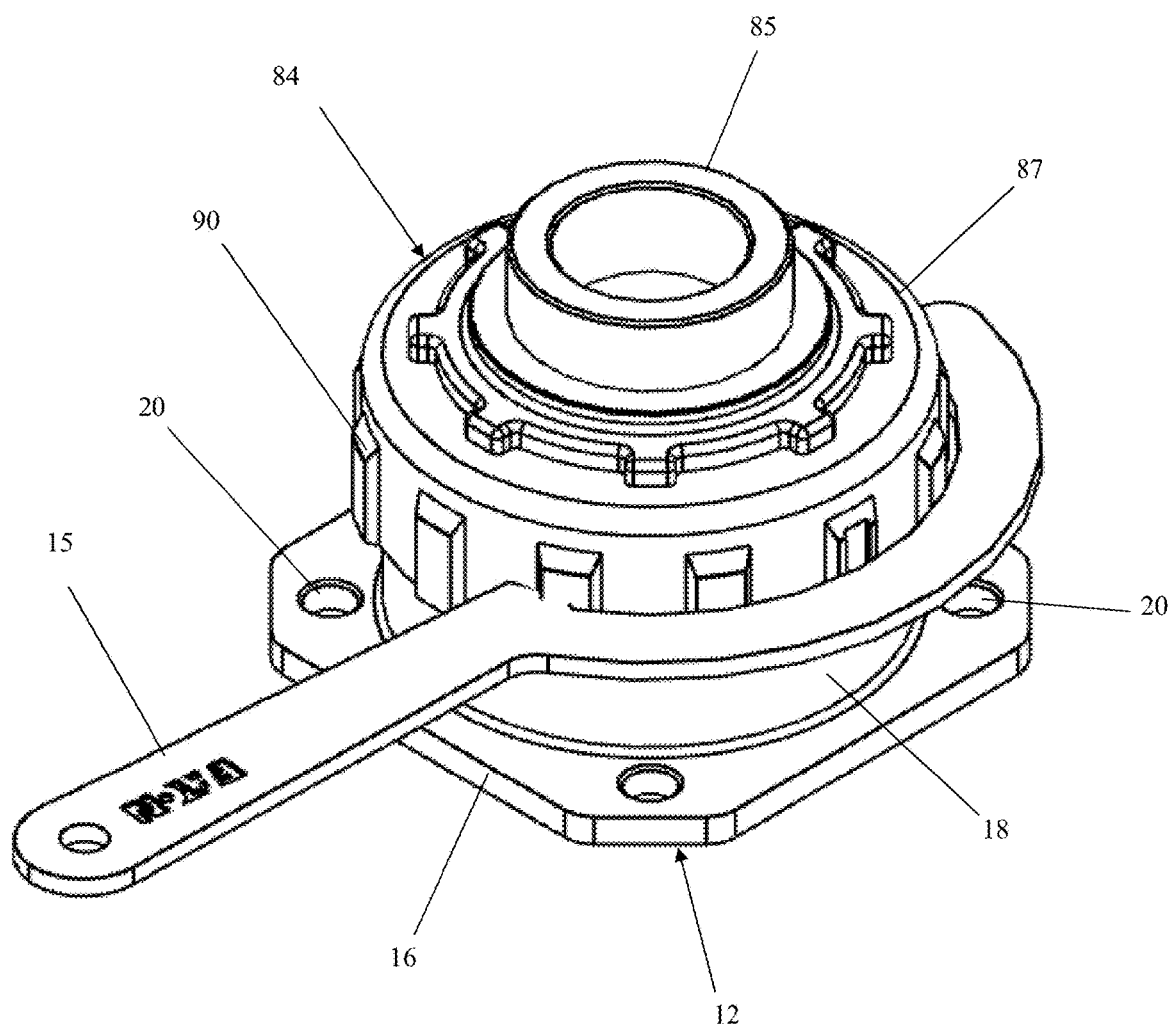
FIG. 8B is another perspective of the connector attached to the base showing a tool used to secure the connector to the base.

Referring to FIG. 7-8B, a plurality of ridges 90 extend from an exterior surface 92 of the collar 87. The ridges 90 provide a grip surface for grasping the connector 84 to rotate the collar 87 around the camera mount 18. The collar 87 may be rotated by hand or with a tool 15 (FIG. 8B). It will be understood that the collar 87 rotates independently of the sleeve 85 such that the sleeve remains fixed relative to the stem 82. In one embodiment, each flange 88 has a corresponding ridge 90 aligned therewith to provide an indication to the user of the location of the flange on the interior surface 86 of the collar 87. This facilitates inserting the flanges 88 into the slots 26 in the camera mount 18 when the flanges are not visible by the user on the interior surface 86 of the collar 87. In one embodiment, the ridges 90 that are aligned with a flange 88 are indicated with an indicia 94. In the illustrated embodiment, the indicia 94 comprises a color coding on the ridge 90. However, other forms of indicia are envisioned without departing from the scope of the disclosure. In one embodiment, at least the connector 84 is formed from a polymer material. In another embodiment, an entirety of the camera unit outer housing is made from a polymer material. Forming some or all the camera unit outer housing from a polymer material substantially reduces the weight of the camera unit 14 as compared to conventional PTZ cameras that are made from stainless steel. In one embodiment, the camera unit 14 weights less than 20 kg. It will be understood, however, that some or all of the camera unit 14 could be made from another material. For instance, the camera unit 14 could be formed from stainless steel.

Figure 9:
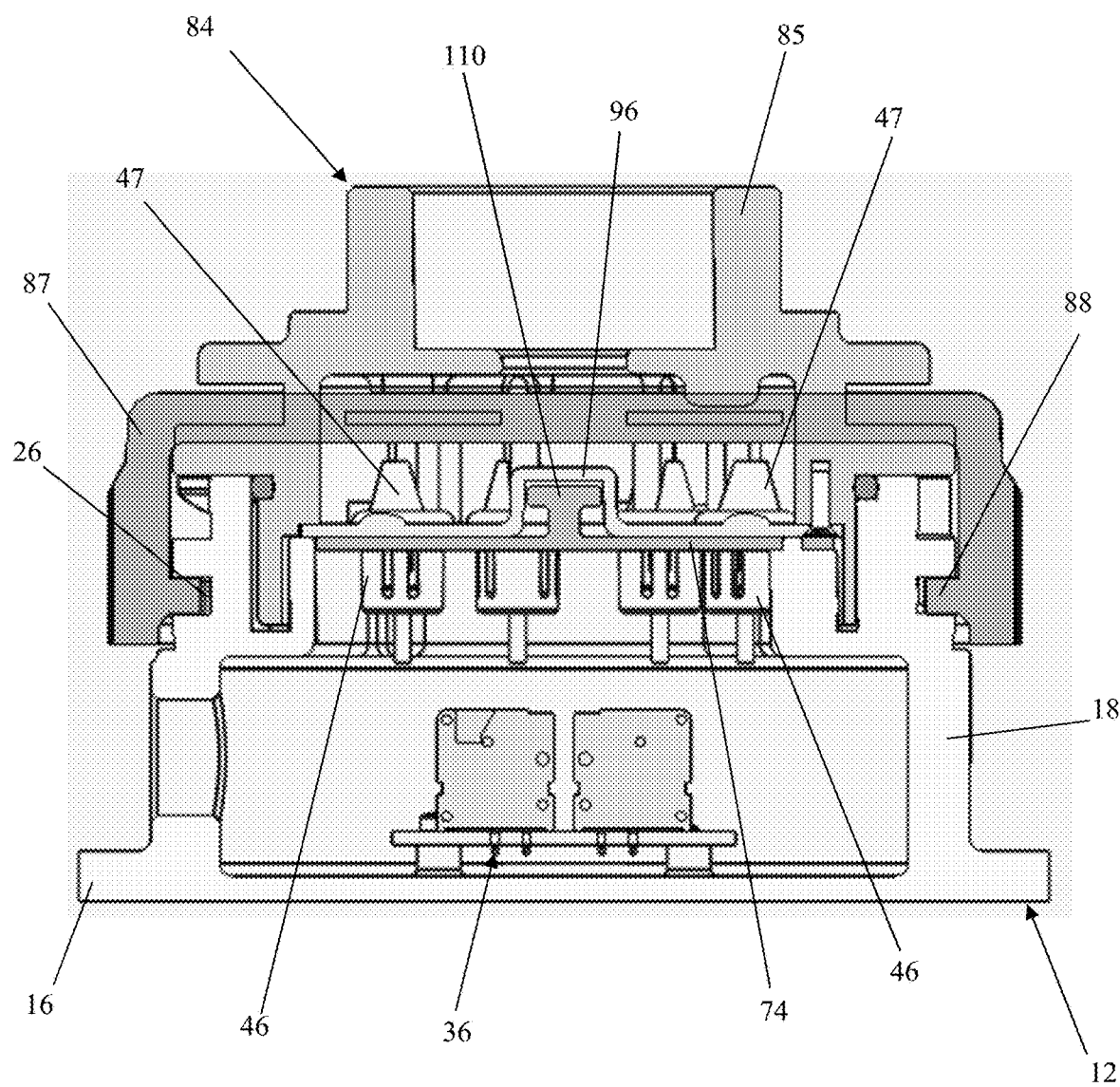
FIG. 9 is a cross section of the connector and base.
Figure 10:
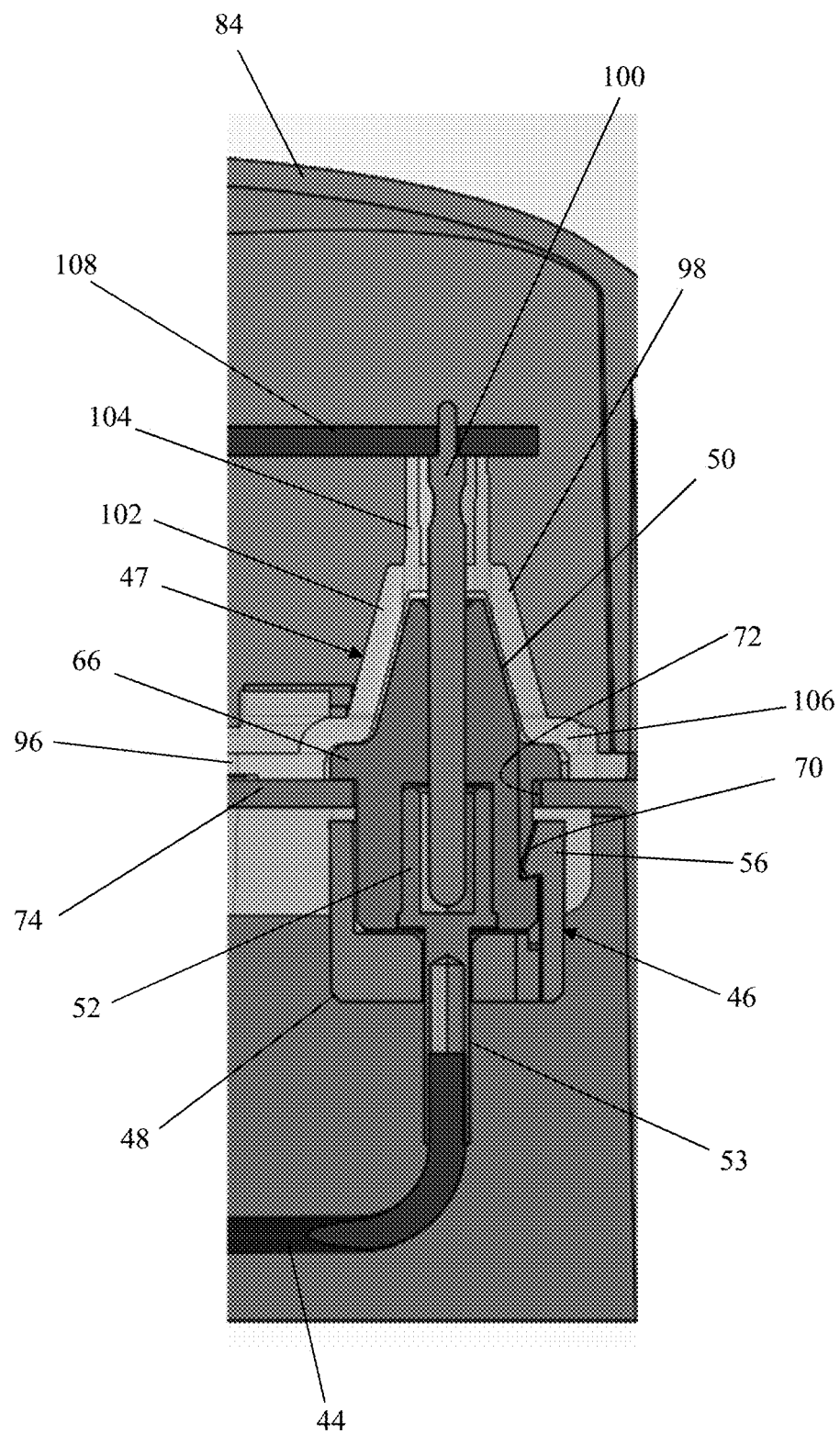
FIG. 10 is a fragmentary cross section of the connector and base.
Figure 11:
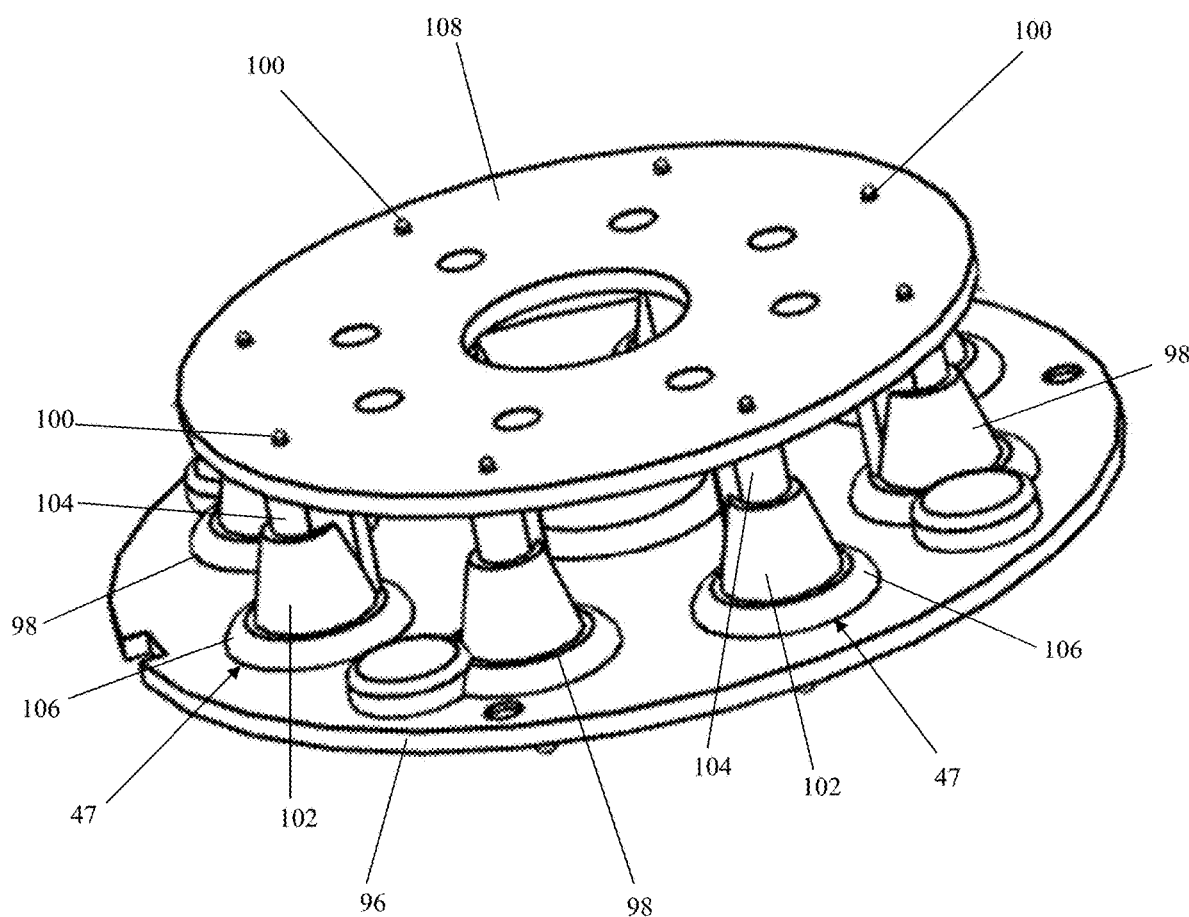
FIG. 11 is a perspective of the connector with a sleeve and collar removed.
Figure 12:
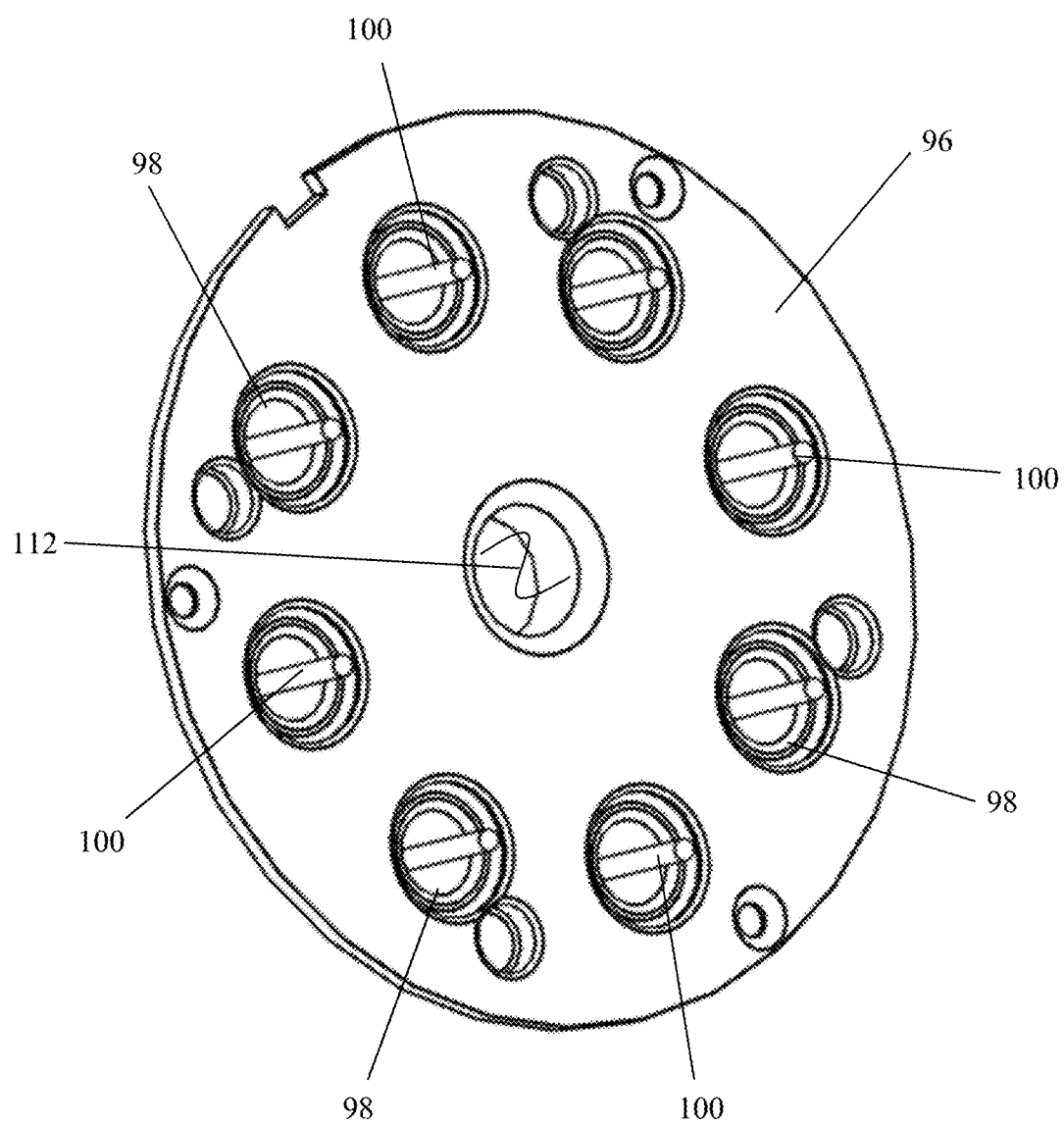
FIG. 12 is another perspective of the connector with the sleeve and collar removed.

Referring to FIGS. 9-12, a plurality of connector assemblies 47 are mounted in the connector 84 by a mounting plate 96. Each connector assembly 47 comprises a connector housing 98 and a contact pin 100 extending through the connector housing (FIG. 10). The connector housings 98 include a hollow conical body 102, a cylindrical top portion 104 extending from a top of the hollow conical body, and an annular rim portion 106 extending around a bottom of the hollow conical body. The contact pins 100 are secured to a printed circuit board (PCB) 108 seated on top of the cylindrical top portions 104 of the connector housings 98. The contact pins 100 extend downward from the PCB through the hollow conical body 102 and past the annular rim portion 106 such that a portion of the contact pin is exposed below the connector housing 98. The exposed portions of the contact pins 100 are configured to make electrical contact with respective tubular connector elements 52 of the connector assemblies 46 in the base 12 to electrically connect the camera unit 14 to the base. In the illustrated embodiment, each connector assembly 47 is an Exde connector. However, the connector assemblies 47 could have other configurations without departing from the scope of the disclosure.

As shown in FIG. 2, the camera unit 14 is moved axially or longitudinally with respect to the axes of the connector 84 and camera mount 18 to locate the flanges 88 on the connector in registration with the slots 26 in the camera mount. The connector 84 may be centered on the camera mount 18 by locating a post 110 on the mounting plate 74 in the camera mount within a receptacle 112 in the mounting plate 96 in the connector (FIG. 9). The camera unit 14 is then moved relative to the base 12 such that the flanges 88 are received in the first section 28 of the slots 26. The collar 87 of the connector 84 is then rotated (e.g., clockwise) relative to the camera mount 18 to move the flanges 88 into the second sections 32 of the slots 26. The collar 87 can be rotated until the flanges 88 reach an end of the second sections 32 of the slots 26 preventing further rotation. Completing this full rotation of the collar 87 releaseably locks the camera unit 14 to the base 12 via the engagement between the connector on the camera unit and the camera mount 18 of the base. Additionally or alternatively, a locking mechanism (e.g., a grub screw) can be used to prevent the collar 87 from being rotated in the opposite direction to detach the connector 84 from the camera mount 18. Completing the full rotation of the collar 87 also electrically connects the camera unit 14 to the base 12 by engaging the connector assemblies 47 in the camera unit with the connector assemblies 46 in the base. In particular, the conical top sections 64 of the second housings 50 in the camera mount 18 are received in the hollow conical bodies 102 of the connector housings 98 in the connector 84, and contact pins 100 of the connector assemblies 47 in the connector are received in the tubular connector elements 52 of the connector assemblies 46 in the camera mount. As such, the connector assemblies 47 in the camera unit 14 are configured to mate with the connector assemblies 46 in the base 12 to provide the necessary electrical connection for operating the camera unit 14. Additionally, because the connector assemblies 46, 47 are hot pluggable connectors, the camera unit 14 can be connected to the base 12 in this manner when the base is mounted and actively connected to a power source and energized. The hot-pluggable configuration of the connector assemblies 46, 47 is such that the only time the contacts pins 100 are in electrical connection with the tubular connector elements 52 are when the pins and elements are contained within the exde chamber formed by the connector assemblies 46, 47. Thus, any spark resulting from the connection is contained within the exde chamber. When it becomes desirable to detach the camera unit 14 from the base 12, the collar 87 of the connector 84 is rotated in an opposite direction (e.g., counter-clockwise) to move the flanges 88 from the second sections 32 of the slots 26 into the first sections 28. Once in this position, the camera unit 14 can be moved axially away from the camera mount 18 to fully detach the camera unit from the base 12. Rotating the collar 87 to detach the camera unit 14 from the base 12 also electrically disconnects the connector assemblies 46, 47 so that the camera unit can be safely separated from the base.

Additionally, the camera 10 is configured to operate when the camera is located within a harsh or hazardous environment. In particular, the housing components (e.g., camera body 80, stem 82, connector 84, base 12) are specifically configured to withstand harsh or hazardous environments and insulate the internal spaces from those environments. As such, the camera 10 is explosion-proof such that the outer housing of the camera will contain any ignition preventing the explosive combustion from reaching an exterior of the camera to interact with the outside environment. For example, the camera 10 meets ATEX/IECEx Standards—EN 60079 regarding explosive atmospheres.

Examples of hazardous locations in which example embodiments can be used include, but are not limited to, an airplane hangar, an airplane, a drilling rig (as for oil, gas, or water), a production rig (as for oil or gas), a refinery, a chemical plant, a power plant, a mining operation, a steel mill, and the like.

In one embodiment, the camera 10 may be connected to a network to configure the camera to provide real-time analysis of the viewing space of the camera. The camera 10 may also be connected to a CCTV system or a cloud based data acquisition and analysis system to link the camera 10 to other connected systems for communicating information externally of the camera. The camera 10 when connected to a networked CCTV system, or the like, may also provide additional Advanced Data Analytics providing more comprehensive data about the camera viewing space.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the compositions without departing from the scope of the disclosure, it is intended that all matter contained in the above description shall be interpreted as illustrative and not in a limiting sense.

The invention claimed is:

1. A camera comprising:
a base configured for mounting to a support structure, the base comprising a mounting plate and a camera mount coupled to the mounting plate, wherein the mounting plate is configured to be coupled to the support structure, wherein the camera mount is cylindrical having an exterior surface defining a plurality of slots extending around the camera mount and toward the mounting plate;
a camera unit configured for releaseable attachment with the base, the camera unit comprising a camera body, electronic camera components disposed within the camera body, a stem attached to the camera body at a first end of the stem and extending away from the camera body to a second end of the stem, and a connector coupled to the second end of the stem, wherein the connector includes an annular collar that is selectively rotatable relative to the stem, the collar including a plurality of flanges on an interior surface of the annular collar configured to be received in respective slots of the camera mount and moved circumferentially within the slots and toward the base as the collar is rotated relative to the stem to couple the camera unit to the base;
a plurality of base connector assemblies received in the base, wherein each of the plurality of base connector assemblies includes a housing having a conical top section defining an opening, and an electrical connector received in the housing and defining an opening in registration with the opening of the conical top section; and
a plurality of camera connector assemblies disposed in the connector of the camera unit, wherein each of the plurality of camera connector assemblies includes a hollow conical body, and a contact pin electrically connected to the electronic camera components and extending through the hollow conical body,
wherein the conical top section of each of the plurality of base connector assemblies is configured to be received in the hollow conical body of one of the plurality of camera connector assemblies and the contact pin of each of the plurality of camera connector assemblies is configured to be received in the respective openings of the conical top section and the electrical connector of one of the base connector assemblies so that the electrical connector and the electrical pin are electrically connected.

2. The camera of claim 1, wherein the camera unit is a pan/tilt/zoom camera.

3. The camera of claim 1, wherein the plurality of contact pins and the plurality of electrical contacts are hot pluggable connectors.

4. The camera of claim 1, wherein at least a portion of the base and camera unit are formed from a polymer material.

5. The camera of claim 1, wherein the base and camera unit together form an explosion-proof housing when the camera unit is attached to the base.

6. The camera of claim 1, wherein the base and camera unit together weigh less than 20 kg.

7. A base for use with an electrical device, the base comprising:
an electrical mount configured to removably couple to the electrical device;
a connector plate disposed in the electrical mount; and
a plurality of hot pluggable electrical connector assemblies coupled to the connector plate and configured for making an electrical connection with the electrical device to electrically connect the base to the electrical device when the base is energized, wherein each of the plurality of hot pluggable connector assemblies includes
a housing having a conical top section defining an opening, and
an electrical connector received in the housing and defining an opening in registration with the opening of the conical top section,
wherein the respective openings of the conical top section and the electrical connector are configured to receive a contact pin of the electrical device.

8. The base of claim 7, wherein the housing has a bottom section and a flange disposed between the conical top section and the bottom section, wherein the flange engages an upper surface of the connector plate and the bottom section extends below a lower surface of the connector plate.

9. The base of claim 8, wherein the electrical connector is received in a cavity defined by the bottom section of the housing.

10. The base of claim 9, wherein each of the plurality of connector assemblies further includes a second housing connected to the bottom section of the housing to retain the electrical connector in the cavity of the bottom section.

11. An electrical unit configured for removable attachment to a base, the electrical unit comprising:
   an electrical unit body;
   electronic components disposed within the electrical unit body;
   a stem attached to the electrical unit body at a first end of the stem and extending away from the electrical unit body to a second end of the stem;
   a connector coupled to the second end of the stem and configured to removably couple to the base, wherein the connector includes an annular collar that is selectively rotatable relative to the stem;
   a printed circuit board disposed in the annular collar and electrically connected to the electronic components;
   a plurality of connector assemblies coupled to the printed circuit board, wherein each of the plurality of connector assemblies includes a hollow conical body, and a contact pin electrically connected to printed circuit board and extending through the hollow conical body.

12. The electrical unit of claim 11, further comprising a mounting plate coupled within and to the connector, wherein each hollow conical body of the plurality of connector assemblies is mounted on the mounting plate.

\* \* \* \* \*